Aug. 17, 1937.                  L. GROSS                    2,090,041
                              COLORIMETER
                          Filed April 10, 1936
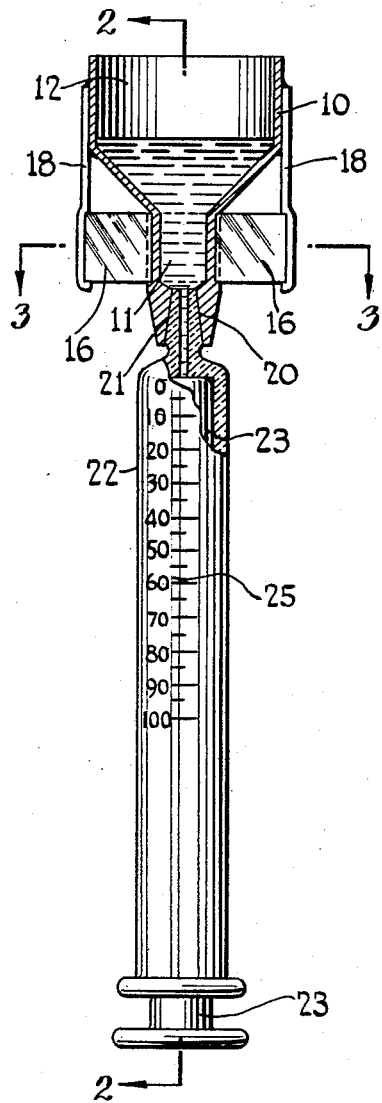
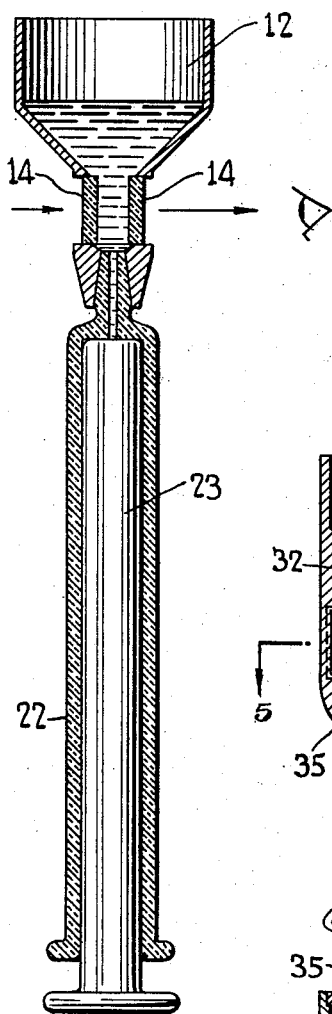
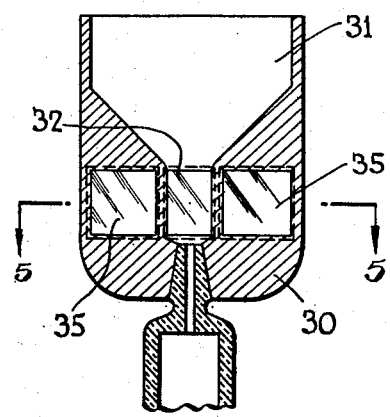
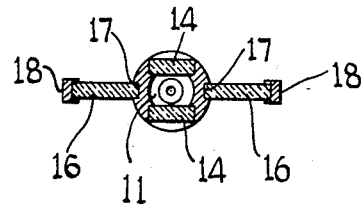
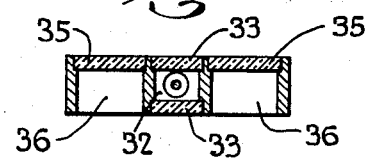
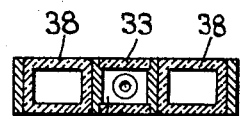
INVENTOR
L. GROSS
BY S. M. Pineles
ATTORNEY Patented Aug. 17, 1937

2,090,041

UNITED STATES PATENT OFFICE 2,090,041

COLORIMETER

Louis Gross, New York, N. Y.

Application April 10, 1936, Serial No. 73,633

3 Claims. (Cl. 88—14)

This invention relates to colorimeters and it has among its objects a simple, accurate colorimeter for enabling quick determination of the characteristics of liquid specimens required in diagnosing the condition of a patient and similar purposes.

The colorimeter of the invention comprises a vessel having in its bottom an optical chamber bounded by parallel transparent walls holding a flat layer of liquid that is to be tested overflowing into a compartment adjoining the optical chamber and one or two flat transparent color standards aligned with the optical chamber for comparing and matching the color of the liquid contained in the chamber and the compartment with the color of the standards. A small graduated syringe connected to the bottom of the optical compartment serves to stir and to maintain the solution uniform and enables accurate, quick determination of its characteristics by withdrawing the tested liquid into the syringe and reading on the scale the volume of the liquid required to match the color standards.

The foregoing and other objects of the invention will be best understood from the following description of exemplifications thereof, reference being had to the accompanying drawing, wherein Fig. 1 is a vertical sectional view of a colorimeter of the invention;

Fig. 2 is a similar view along line 2—2 of Fig. 1;

Fig. 3 is a horizontal sectional view through the optical compartment along line 3—3 of Fig. 1;

Fig. 4 is a view similar to Fig. 1 of a modified form of the invention;

Fig. 5 is a horizontal sectional view of this modification along line 5—5 of Fig. 4; and Fig. 6 is a view similar to Fig. 5 of a further modification.

The colorimeter shown in Figs. 1 to 3 comprises a small test vessel 10 having a bottom portion of small volume serving as an optical chamber 11 communicating with an upper wider overflow chamber 12. The optical compartment 11 is bounded by two flat transparent glass walls 14 confining a flat layer of liquid of fixed thickness which together with the glass walls 12 constitutes a flat passage transmitting light through the compartment. On the opposite sides of the optical chamber are mounted flat transparent color standards 16 made, for instance, of suitably colored glass. The color standards are held in place against the side walls of the optical chamber by springs 18 attached to the walls of the overflow compartment to permit quick substitution of one set of color standards for another.

Into an outlet opening 20 in the bottom of the test vessel is inserted the inlet nozzle 21 of a small glass syringe 22 having a piston 23 for withdrawing liquid from the vessel 10 into the syringe barrel and measuring the withdrawn liquid on a scale 25 provided on the syringe.

This combination of a simple attachment with a standard syringe constitutes a reliable colorimeter and enables ready and exact determination of the characteristics of the tested liquid.

The color standards on both sides of the optical chamber may be made of the color of a standard solution containing a predetermined quantity of a specific ingredient in a predetermined quantity of a specific liquid solvent. A predetermined quantity of this standard solution filling a part of the overflow compartment and the entire optical compartment will, if withdrawn into the syringe barrel, give a reading on the syringe scale corresponding to the standard solution which may be designated as a 100% solution.

To determine the percentage of the same ingredient of an unknown specimen to be tested, the same predetermined quantity of the unknown specimen is placed in the optical compartment and sufficient solvent is gradually added until the color of the solution filling the optical compartment matches the color standards of the attachment. As additional solvent is added to the solution, the syringe piston is moved down and up to stir up the solution and render it uniform enabling quick and accurate matching of the color of the solution with the standards. Once the color of the solution is matched with the standards, it is withdrawn into the barrel of the syringe and the reading on the syringe scale enables ready determination of the amount of the ingredient present in the unknown specimen. The scale on the syringe may be designed to give direct readings of the percentage of the ingredient, or a syringe with a standard volume scale may be used in conjunction with a calibration chart for determining the percentage of the ingredient.

In Figs. 4 and 5 is shown a modification of the invention in which the test vessel is made in the form of a flat block 30 having a large overflow compartment 31 provided with an optical chamber 32 bounded on the opposite sides by the transparent glass walls 33 permitting passage of light through the flat layer of liquid of predetermined thickness filling the chamber. Standard color specimens 35 are inserted into square perforations provided on both sides of the optical compartment 32. Light channels 36 are thus formed for each of the standard color specimens facilitating the matching of the color of the liquid in the optical chamber 32 with the colored specimens in the two side compartments 36.

In Fig. 6 is shown a modification of the invention using a test vessel similar to that shown in Figs. 4 and 5 provided with color standards 38 consisting of transparent flat glass vessels filled with a flat layer of a standard solution, permitting ready adaptation of the colorimeter for any desired measurements.

The exemplifications of the invention described above will suggest to those skilled in the art many other ways of combining within a container of a dilution type colorimeter a flat optical compartment and a graduated cylindrical compartment arranged to permit ready mixing of the tested liquid with additional solvent and the determination by the graduations of the cylindrical compartment of the total volume of the diluted liquid within the container at which the layer of the liquid in the flat optical compartment matches a standard specimen. It is accordingly desired that the appended claims be given a construction commensurate with the scope of the invention.

I claim:

1. In a dilution type colorimeter for determining the color intensity of a liquid by varying its color concentration until its color intensity matches the color of a standard, a graduated syringe vessel for measuring the volume of the tested liquid, an optical chamber of small volume connected to one end of said syringe vessel, an open overflow compartment shaped and proportioned to hold a part of the tested liquid and receive additional liquid for diluting the total volume of the tested liquid, said optical chamber being bounded by transparent walls confining a fraction of the volume of the tested liquid in the form of a flat layer of predetermined thickness for transmitting light in a direction perpendicular to said layer, a standard transparent color specimen aligned adjacent to said optical chamber for transmitting light in a direction substantially parallel to the direction of the light transmitted through said chamber, and a piston fitting into said syringe vessel and movable therein to mix quantities of liquid added to said overflow compartment with tested liquid contained in said chamber and said compartment for diluting the total volume of tested liquid with the added liquid and producing an increased volume of tested liquid of uniform color intensity in said optical chamber and said overflow compartment.

2. In a dilution-type colorimeter for determining the color intensity of a liquid by varying its color concentration until its color intensity matches the color of a standard, a graduated syringe vessel for measuring the volume of the tested liquid, an optical chamber of small volume located at one end of said syringe vessel, an open overflow compartment shaped and proportioned to hold a part of the tested liquid and receive additional liquid for diluting the total volume of the tested liquid, said optical chamber being bounded by flat parallel transparent walls confining a fraction of the volume of the tested liquid in the form of a flat layer of predetermined fixed thickness for transmitting light in a direction perpendicular to said flat layer, a flat standard transparent color specimen aligned adjacent to said optical chamber for transmitting light in a direction substantially parallel to the direction of the light transmitted through said chamber, and a piston fitting into said syringe vessel and movable therein to mix quantities of liquid added to said overflow compartment with tested liquid contained in said chamber and said compartment for diluting the total volume with the added liquid and producing an increased volume of tested liquid of uniform color intensity in said optical chamber and said overflow compartment, the transparent areas of said optical chamber and said color specimen being sufficiently small and lying in sufficient proximity to each other to bring the light rays passing through said chamber and said specimen within the normal range of vision of the observer.

3. In a dilution-type colorimeter for determining the color intensity of a liquid by varying its color concentration until its color intensity matches the color of a standard, container means for holding a volume of tested liquid having an opening for receiving additional liquid and diluting the total volume of the tested liquid, a portion of said container means constituting an optical chamber bounded by transparent walls confining a fraction of the volume of the tested liquid in the form of a flat layer of predetermined thickness for transmitting light in a direction perpendicular to said layer, a standard transparent color specimen aligned adjacent to said optical chamber for transmitting light in a direction substantially parallel to the direction of the light transmitted through said chamber, and means for agitating the liquid within said containing means and mixing liquid added to the tested liquid with tested liquid to produce an increased volume of tested liquid of uniform color intensity in said container means, a portion of said container means constituting a graduated cylindrical measuring compartment constructed and arranged to measure and indicate the total volume of the diluted tested liquid contained in said container means.

LOUIS GROSS.